US 6,490,600 B1

(12) United States Patent
McGarry

(10) Patent No.: US 6,490,600 B1
(45) Date of Patent: Dec. 3, 2002

(54) PROCESSING CONTINUOUS DATA STREAMS IN ELECTRONIC SPREADSHEETS

(75) Inventor: John McGarry, Portland, OR (US)

(73) Assignee: Cognex Technology and Investment Corporation, Natick, MA (US)

( * ) Notice: Subject to any disclaimer, the term of this patent is extended or adjusted under 35 U.S.C. 154(b) by 0 days.

(21) Appl. No.: 09/370,808

(22) Filed: Aug. 9, 1999

(51) Int. Cl.[7] .......................... G06F 15/00; G06F 17/21; G06F 17/24
(52) U.S. Cl. ........................ 707/503; 707/500; 345/505
(58) Field of Search ................................ 707/503, 500; 705/35; 712/34; 345/505; 717/11

(56) References Cited

U.S. PATENT DOCUMENTS

| 5,410,649 A | * | 4/1995 | Gove ........................... 345/505 |
| 5,574,930 A | * | 11/1996 | Halverson, Jr. et al. ...... 712/34 |
| 5,774,878 A | * | 6/1998 | Marshall ...................... 705/35 |
| 5,926,822 A | * | 7/1999 | Garman ........................ 707/503 |
| 6,078,747 A | * | 6/2000 | Jewitt ........................... 717/11 |

OTHER PUBLICATIONS

Mintchell, Gary A., Vision systems revealed, Control Engineering Online, [URL:http://www.controleng.com/archives/1998/ctl1101.98/11dbas.htm], pp. 1–2, Nov. 1998.*
Varshney, A. et al., Finesse: a financial information spreadsheet, IEEE Symposium on Information Visualization, pp. 70–71, 125, Oct. 1996.*
Titus, Jon, Machine–Vision Software: It's Not Just For Experts, Test & Measurement World, downloaded from url:<http://www.tmworld.com/articles/Apr. 15, 1999_machine_vision.html>, Apr. 15, 1999, download on Nov. 30, 2001, pp. 1–7.*
Banerjea, Dave K., Smart Choices in Calibration Management Software, Apr. 1998, downloaded from <url:http://www.qualitydigest.com/apr. 98/html/calsoft>, pp. 1–8, downloaded on Jul. 9, 2002.*

\* cited by examiner

*Primary Examiner*—Joseph H. Feild
*Assistant Examiner*—William L. Bashore
(74) *Attorney, Agent, or Firm*—Russ Weinzimmer

(57) ABSTRACT

An improved electronic spreadsheet is provided for applications that require the processing of continuous data streams over a time-based data interval of size greater than one. The improved spreadsheet supports the creation of expressions involving clocked delay line objects instantiated within spreadsheet cells. The delay line object includes data storage and a member function that implements a shift register. Data stream input functions supply the clocking signals that trigger the execution of the shift register function of the delay line object. Spreadsheet functions are provided that support random access of elements and other analysis over the buffered data interval. The forgoing improvements extend the effective range of spreadsheet programming to include a wider range of applications than was previously possible, including signal processing, machine vision, and time evolution studies.

7 Claims, 3 Drawing Sheets

| B1 = INPUT(1) | | | | | | 1 |
|---|---|---|---|---|---|---|
| | A | B | C | D | E | |
| 1 | Data1: | 3.00 | | | | |
| 2 | DLine: | DELAY | | | | |

| B2 = DELAY(B1*B1,B1,3,1) | | | | | | 2 |
|---|---|---|---|---|---|---|
| | A | B | C | D | E | |
| 1 | Data1: | 3.00 | | | | |
| 2 | DLine: | DELAY | | | | |

| B3 = TAP(B2,0) | | | | | | 3 |
|---|---|---|---|---|---|---|
| | A | B | C | D | E | |
| 1 | Data1: | 3.00 | | | | |
| 2 | DLine: | DELAY | | | | |

| B4 = TAP(B2,1) | | | | | | 4 |
|---|---|---|---|---|---|---|
| | A | B | C | D | E | |
| 1 | Data1: | 3.00 | | | | |
| 2 | DLine: | DELAY | | | | |

| B5 = TAP(B2,2) | | | | | | 5 |
|---|---|---|---|---|---|---|
| | A | B | C | D | E | |
| 1 | Data1: | 3.00 | | | | |
| 2 | DLine: | DELAY | | | | |

| B6 = SQRT(B3+B4+B5) | | | | | | 6 |
|---|---|---|---|---|---|---|
| | A | B | C | D | E | |
| 1 | Data1: | 3.00 | | | | |
| 2 | DLine: | DELAY | | | | |
| 3 | Tap 1: | 9.00 | | | | |
| 4 | Tap 2: | 4.00 | | | | |
| 5 | Tap 3: | 1.00 | | | | |
| 6 | Mag: | 3.742 | | | | |

Figure 1

B6 = SQRT(B3+B4+B5)

|   | A      | B     | C | D | E |
|---|--------|-------|---|---|---|
| 1 | Data1: | 3.00  |   |   |   |
| 2 | DLine: | DELAY |   |   |   |
| 3 | Tap 1: | 9.00  |   |   |   |
| 4 | Tap 2: | 4.00  |   |   |   |
| 5 | Tap 3: | 1.00  |   |   |   |
| 6 | Mag:   | 3.742 |   |   |   |

Time = T - 3

B6 = SQRT(B3+B4+B5)

|   | A      | B     | C | D | E |
|---|--------|-------|---|---|---|
| 1 | Data1: | 4.00  |   |   |   |
| 2 | DLine: | DELAY |   |   |   |
| 3 | Tap 1: | 16.00 |   |   |   |
| 4 | Tap 2: | 9.00  |   |   |   |
| 5 | Tap 3: | 4.00  |   |   |   |
| 6 | Mag:   | 5.385 |   |   |   |

Time = T - 2

B6 = SQRT(B3+B4+B5)

|   | A      | B     | C | D | E |
|---|--------|-------|---|---|---|
| 1 | Data1: | 5.00  |   |   |   |
| 2 | DLine: | DELAY |   |   |   |
| 3 | Tap 1: | 25.00 |   |   |   |
| 4 | Tap 2: | 16.00 |   |   |   |
| 5 | Tap 3: | 9.00  |   |   |   |
| 6 | Mag:   | 7.071 |   |   |   |

Time = T - 1

B6 = SQRT(B3+B4+B5)

|   | A      | B     | C | D | E |
|---|--------|-------|---|---|---|
| 1 | Data1: | 6.00  |   |   |   |
| 2 | DLine: | DELAY |   |   |   |
| 3 | Tap 1: | 36.00 |   |   |   |
| 4 | Tap 2: | 25.00 |   |   |   |
| 5 | Tap 3: | 16.00 |   |   |   |
| 6 | Mag:   | 8.775 |   |   |   |

Time = T - 0

Figure 2

PROCESSING CONTINUOUS DATA STREAMS IN ELECTRONIC SPREADSHEETS

FIELD OF THE INVENTION

The present invention relates to electronic spreadsheets, and particularly to spreadsheets applied to processing continuous data streams.

BACKGROUND OF THE INVENTION

The superior ease-of-use characteristics of electronic spreadsheets are well-known, especially in the field of office automation. The use of electronic spreadsheets in other fields is also known, although in the past, certain computer applications have been unable to take full advantage of the spreadsheet metaphor. One reason for this is that a large class of computer applications require algorithms that operate over time-based intervals of a continuous data stream, and conventional spreadsheets provide no intrinsic support for continuous data processing over more than one processing interval.

An electronic spreadsheet is, essentially, a means of graphically representing a set of expressions as a grid of cells. Each cell in the spreadsheet grid represents a parenthetical expression that can, in turn, be a function of some number of other cellular expressions.

A spreadsheet program updates its grid, as necessary, to maintain the programmed relationship between cellular expressions. Electronic spreadsheets are intended to provide immediate response to any modifications of the programmed expressions. However, in conventional electronic spreadsheets, cellular expressions have no means for accessing previously evaluated results from prior processing intervals. Absent this capability, it is impossible for a conventional spreadsheet to process a continuous data stream of incoming data on a time-based interval of a duration greater than one processing interval.

Although methods for implementing algorithms that operate on continuous data streams are well-known in computer programming, no methods are known for implementing this class of processing within the context of an electronic spreadsheet.

SUMMARY OF THE INVENTION

The invention provides an electronic spreadsheet adapted for programming the processing of continuous data streams. The invention also provides means and methods that, to a high degree preserve the fundamental characteristics of conventional electronic spreadsheets. The invention also provides means and methods, which are uncomplicated and intuitive to use.

These benefits and features are accomplished by extending the spreadsheet paradigm to include apparatuses and methods of clocked data buffering, such as by using shift registers, delay lines, FIFOs, pipelines, and even random access memory. The use of shift registers is preferred because shift registers do not require addressing. Delay lines objects are instantiated (memory is allocated for each delay line object) and assigned to spreadsheet cells (each allocated memory is associated with the coordinates of a cell). A delay line object includes a data buffer configured as a variable length shift register, and a method for clocking data through the buffer. In a preferred embodiment, input data streams supply the clocking signals, and "tap functions" support random access of elements, and other analysis over the buffered interval.

The invention extends the conventional electronic spreadsheet paradigm to include the processing of continuous data streams on finite intervals.

BRIEF DESCRIPTION OF DRAWING

The invention will be more fully understood from the following detailed description, in conjunction with the following figures, wherein:

FIG. 1 is an example illustrating methods of electronic spreadsheet programming for processing continuous data streams of the invention;

FIG. 2 is an example output sequence illustrating the response of the example program of FIG. 1 to a specific input sequence;

DETAILED DESCRIPTION

Referring to FIG. 1, a sequence of user interface screens 1, 2, 3, 4, 5, and 6 illustrates how a spreadsheet processes a continuous data stream according to the invention. Displayed is a spreadsheet program that computes the square root of the sum of the squares of the last three data elements of a continuous data stream. The spreadsheet program of FIG. 1 is constructed in 6 expressions entered in cells B1, B2, B3, B4, B5, and B6.

Cell B1 contains an external input function "INPUT(1)". The input function "INPUT(1)" accesses a data source "1" external to the spreadsheet. In this example, we assume that cell B1 updates periodically as a function of some unspecified external event, e.g., in response to data on the lines of a parallel port whenever a line is toggled, or in response to a pixel value at specified coordinates in an image at a particular time.

Cell B2 contains an instance of a delay line object, and is parameterized with four parameters: the input data stream (B1 *B1), the clock source (B1), the number of elements in the shift register (3), and the clock divider (1).

Figure 3A:
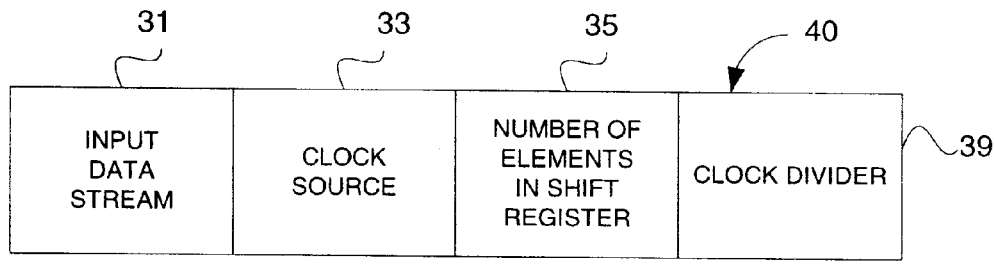
FIG. 3A is a diagram of the parameters of the delay line object of FIG. 3.
Figure 3:
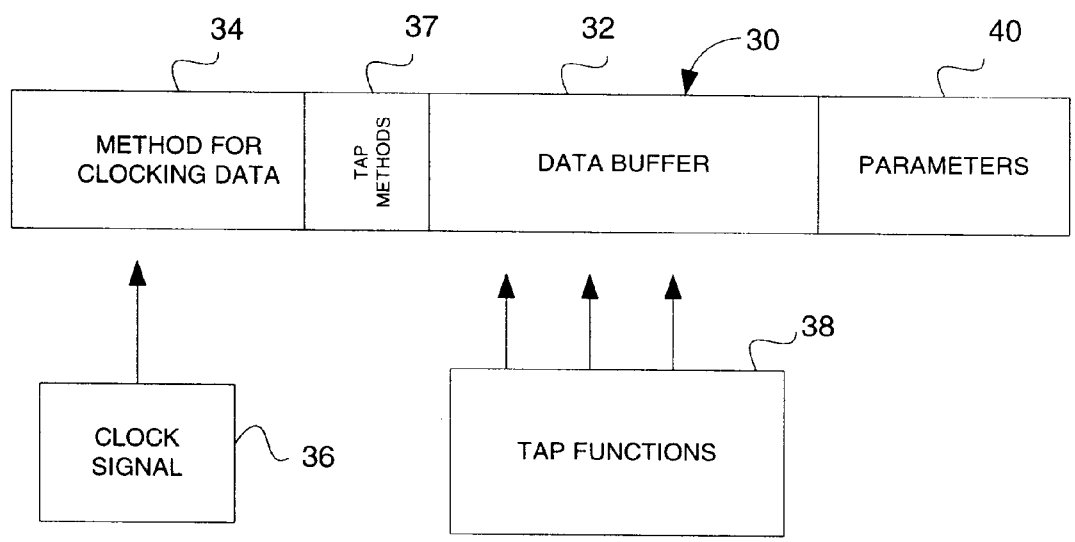
FIG. 3 is a diagram illustrating the components of a delay line object.

Referring to FIG. 3, a delay line object 30 consists of a data buffer 32 configured as a variable length shift register (or as a delay line, FIFO, pipeline, etc.), and a method for clocking data through the buffer 34. The clock signal 34 indicates when data is valid for processing in the spreadsheet. Input data streams supply the clock signals 34, and "buffered interval" spreadsheet functions support the random access of elements and other analysis over the buffered interval. For example, parallel random access of data elements is performed using "tap functions" 36 that independently access single values from the delay line buffer 32 at particular specified locations by calling methods 37 of the delay line object. Analysis over the buffered interval includes any vector operation on the data buffer, including summing the buffer, and performing a standard deviation or other statistical analysis on the buffer. Further, other sources of clocking signals include a timer (e.g., a clock edge every 20 seconds), an image acquire signal, or a parallel port, or any external event, for example. Other spreadsheet entities can also provide clock signals. The delay line object also includes a plurality of parameters 40, as detailed in FIG. 3A.

Referring to FIG. 3A, the delay line object is parameterized by four arguments. The first argument is the input data stream 31; the second argument is the clock source 33; the third argument is the number of elements in the shift register buffer (delay line) 35; and the forth argument is a clock divider 39.

In the example of FIG. 1, the data source is defined by an expression that squares the input data stream B1; the clock source is referenced to cell B1; the number of data elements in the shift register is three; and the sample rate is one per cycle. So, when data is received in B1, it is squared and input to a three-element delay line.

Cells B3, B4, and B5 access the delay line instantiated in B2 to return the values of all three elements in the delay line data buffer. The tap function TAP(B2,0) in cell B3 accesses the last data item to be input to the delay line in cell B2. The tap functions TAP(B2,1) and TAP(B2,2) in cells B4 and B5, respectively, access data that was input on the previous two clock cycles 1 and 2.

Cell B6 completes the processing by referencing B3, B4, and B5 in a computation of the square root of the sum of the three values B3, B4, and B5 returned from the delay line's buffer.

FIG. 2 shows the final four spreadsheet display states that result when the spreadsheet program of FIG. 1 processes the input data stream {1.00,2.00,3.00,4.00,5.00,6.00}:

At time (T-3) cells B3, B4 and B5 display the values 9.00, 4.00, and 1.00, respectively, resulting from the squaring of the first three input data elements 3.00, 2.00, and 1.00;

At time (T-2) the value 16.00, the square of the input data value B1=4.00 (B1*B1), shifts into the delay line;

At time (T-1) the value 25.00, the square of the input data value B1=5.00 (B1 *B1) shifts into the delay line; and At time (T-0) the value 36.00, the square of the input data value B1=6.00 (B1 *B1) shifts into the delay line.

For every cycle, the square root of the sum of the delay line contents (Mag) is computed by the expression assigned to cell B6: (B6=SQRT(B3+B4+B5)).

The input function INPUT(1) receives data from an external source and updates the value assigned to B1. The delay line object in B2 (B2=DELAY(B1*B1,B1,3,1) is clocked by the input function, and a new value is shifted into the data buffer upon each new input. The three tap functions TAP(B2,0), TAP(B2,1 ),and TAP(B2,2) are dependent on the contents of the delay line B2, and update in an unspecified order. Finally, the expression in B6 (SQRT(B3+B4+B5)) is dependent on B3, B4, and B5, and is evaluated, the result being assigned to B6. At this point, all dependencies have been satisfied, and the contents of the spreadsheet remain unchanged until the next input event occurs.

In the forgoing example, the delay line expression in B2 behaves in a way very different from a conventional spreadsheet expression. First, the delay line is not a function; rather, it is an object instance, i.e., there is data storage (memory) allocated. Delay line class objects combine data storage with a member function that implements the shift register, for example.

Second, unlike a conventional spreadsheet expression that is evaluated only as necessary to update the spreadsheet, according to the invention, the evaluation of the delay line member function is executed only upon triggering by a clock signal. The value of the input to the delay line member function does not need to change to force the evaluation of the delay line member function. The state of the source data argument is irrelevant; the shift register action can only be activated by a signal from a valid clock source, such as the input function in the example.

Referring to FIG. 3, the delay line object 30 consists of a data buffer 32 configured as a variable length shift register (or as a delay line, FIFO, pipeline, etc.), and a method for clocking data through the buffer 34. The clock signal 36 indicates when data is valid for processing in the spreadsheet. Input data streams supply the clock signals 36, and buffered interval functions support the random access of elements, and other analysis over the buffered interval. For example, parallel random access of data elements is performed using "tap functions" 38 that independently access single values from the delay line buffer 32 at particular specified locations by calling methods 37 of the delay line object. Analysis over the buffered interval includes any vector operation on the data buffer, including summing the buffer, and performing a standard deviation or other statistical analysis on the buffer. Further, other sources of clocking signals include a timer (e.g., every 20 seconds), an image acquire signal, a parallel port, or any external event, for example. Other spreadsheet entities can also provide clock signals.

The delay line object 30 also includes a plurality of parameters 40, as detailed in FIG. 3A, including, for example, the input data stream 31, the clock source 33, the number of elements in the shift register, and the clock divider 39.

Other modifications and implementations will occur to those skilled in the art without departing from the spirit and the scope of the invention as claimed. Accordingly, the above description is not intended to limit the invention except as indicated in the following claims.

What is claimed is:

1. An electronic spreadsheet for processing a continuous data stream, the electronic spreadsheet having a plurality of cells, the improvement comprising:

a clocked delay line object, the clocked delay line object being instantiated and assigned to a cell of the electronic spreadsheet;

an external data input function adapted to provide a clock signal to the clocked delay line object; and a spreadsheet function adapted to provide random access to data stored in the clocked delay line object.

2. The electronic spreadsheet of claim 1, wherein the clocked delay line object is parameterized by a plurality of arguments, including:

an input data stream;

a clock source;

a number of elements in a shift register buffer; and a clock divider.

3. The electronic spreadsheet of claim 1, wherein the clocked delay line object further includes:

a method for clocking data; and a method for access to data stored in the clocked delay line object.

4. The electronic spreadsheet of claim 1, wherein the clocked delay line object is adapted to trigger the execution of the shift register function of the delay line object upon receipt of a clock signal provided by the external data input function.

5. The electronic spreadsheet of claim 1, further including a spreadsheet function that performs analysis of a data interval stored in the clocked delay line object.

6. A method for using an electronic spreadsheet for processing continuous data streams over an interval of size greater than one, the method comprising:

instantiate and assign a clockable delay line object having data storage to at least one cell of the electronic spreadsheet;

provide a clock signal to the delay line object;

randomly access the data storage over an interval of size greater than one; and process the data so-accessed.

7. A method for processing continuous data streams over an interval of size greater than one using an electronic spreadsheet having clocked delay line objects instantiated in the cells of the electronic spreadsheet, each delay line object having a delay line buffer, a source of clock signals, and spreadsheet functions that support selectable access to data stored in a delay line of the clocked delay line object, the method comprising:

assign to a first cell an external input function adapted to access a data source external to the spreadsheet;

assign to a second cell an instance of a delay line object;

assign to a plurality of cells a respective plurality of tap functions, each tap function adapted to access the delay line buffer of the delay line object at a selectable clock cycle to provide a respective plurality of data elements stored in the delay line buffer; and assign to at least one cell a function adapted to process the plurality of data elements upon each clock cycle.

* * * * *

UNITED STATES PATENT AND TRADEMARK OFFICE
CERTIFICATE OF CORRECTION

PATENT NO.    : 6,490,600 B1
DATED         : December 3, 2002
INVENTOR(S)   : McGarry It is certified that error appears in the above-identified patent and that said Letters Patent is hereby corrected as shown below:

Column 4,
Lines 32-41, delete and add:
1. An electronic spreadsheet for processing a continuous data stream, the electronic spreadsheet having a plurality of cells, the improvement comprising:

a clocked delay line object, the clocked delay line object being instantiated as a software object and assigned to a cell of the spreadsheet, the clocked delay line object comprising a data buffer configured as a variable length shift register, and a method for clocking data through the buffer;

an external data input function adapted to provide a clock signal to the clocked delay line object; and a spreadsheet function adapted to provide random access to data stored in the clocked delay line object.

Column 4, lines 63-68 thru Column 5, lines 1-4,
Delete and add:
6. A method for using an electronic spreadsheet for processing continuous data streams over an interval of size greater than one, the method comprising:

instantiate as a software object and assign a clockable delay line object having data storage to at least one cell of the electronic spreadsheet, the clockable delay line object comprising a data buffer configured as a variable length shift register, and a method for clocking data through the buffer;

provide a clock signal to the delay line object;

randomly access the data storage over an interval of size greater than one; and process the data so-accessed.

UNITED STATES PATENT AND TRADEMARK OFFICE
CERTIFICATE OF CORRECTION

PATENT NO. : 6,490,600 B1
DATED : December 3, 2002
INVENTOR(S) : McGarry

It is certified that error appears in the above-identified patent and that said Letters Patent is hereby corrected as shown below:

<u>Column 5, lines 5-12 thru Column 6, lines 1-10,</u>
Delete and add:
7. A method for processing continuous data streams over an interval of size greater than one using an electronic spreadsheet having clocked delay line objects instantiated as software objects in the cells of the electronic spreadsheet, each delay line object having a delay line buffer configured as a variable length shift register and a method for clocking data through the buffer, a source of clock signals, and spreadsheet functions that support selectable access to data stored in a delay line of the clocked delay line object, the method comprising:

assign to a first cell an external input function adapted to access a data source external to the spreadsheet;

assign to a second cell an instance of a delay line object;

assign to a plurality of cells a respective plurality of tap functions, each tap function adapted to access the delay line buffer of the delay line object at a selectable clock cycle to provide a respective plurality of data elements stored in the delay line buffer; and assign to at least one cell a function adapted to process the plurality of data elements upon each clock cycle.

Signed and Sealed this

Sixth Day of September, 2005

JON W. DUDAS
*Director of the United States Patent and Trademark Office*